United States Patent [19]

Bilbrey et al.

[11] Patent Number: 4,543,571
[45] Date of Patent: Sep. 24, 1985

[54] OPTO-MECHANICAL CURSOR POSITIONING DEVICE

[75] Inventors: Robert A. Bilbrey, Orinda; Bruce R. Koball, Berkely, both of Calif.

[73] Assignees: Universal Supply, Inc.; Edward F. Towers, both of San Francisco, Calif.

[21] Appl. No.: 439,552

[22] Filed: Nov. 5, 1982

[51] Int. Cl.$^4$ ............................................. G09G 1/00
[52] U.S. Cl. ................................... 340/710; 340/709; 178/18; 250/231 R
[58] Field of Search ............. 340/710, 709, 870.29, 340/708, 707; 178/17 D, 18, 19, 20; 364/190; 382/59, 65, 69; 74/471 XY; 250/231 R, 234, 203 CT, 549

[56] References Cited

U.S. PATENT DOCUMENTS

| | | | |
|---|---|---|---|
| 3,541,541 | 11/1970 | Engelbart | 340/710 |
| 3,805,907 | 4/1974 | Knothe et al. | 250/234 |
| 3,835,464 | 9/1974 | Rider | 340/710 |
| 3,892,963 | 7/1975 | Hawley et al. | 250/231 R |
| 3,967,135 | 6/1976 | Balban et al. | 250/231 R |
| 3,987,685 | 10/1976 | Opocensky | 74/471 XY |
| 4,260,979 | 4/1981 | Smith | 340/707 |
| 4,318,096 | 3/1982 | Thornburg et al. | 340/710 |
| 4,390,873 | 6/1983 | Kirsch | 340/710 |
| 4,409,479 | 10/1983 | Sprague et al. | 340/710 |

OTHER PUBLICATIONS

VLSI Design, Jan./Feb. 1982, "Designing and Testing the Optical Mouse", Lyon and Haeberli, pp. 20–30.

*Primary Examiner*—Gerald L. Brigance
*Attorney, Agent, or Firm*—Majestic, Gallagher, Parsons & Siebert

[57] ABSTRACT

A hand-held "Mouse" contains an optical system for detecting the number of patterns crossed by its movement across a periodic optical pattern. The optical system is limited to detecting the distance traveled by the mouse across the pattern, a mechanical displacement device within the mouse being utilized to detect the direction of movement. Signals from the optical distance detector and the mechanical direction detector are combined to drive the cursor in a controlled direction across a cathode ray tube or other display device.

6 Claims, 8 Drawing Figures

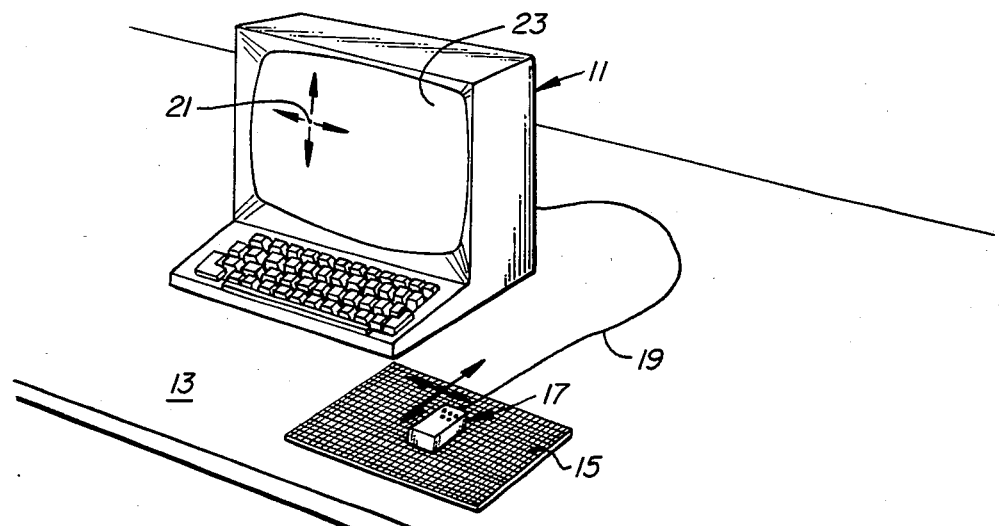
FIG._1.
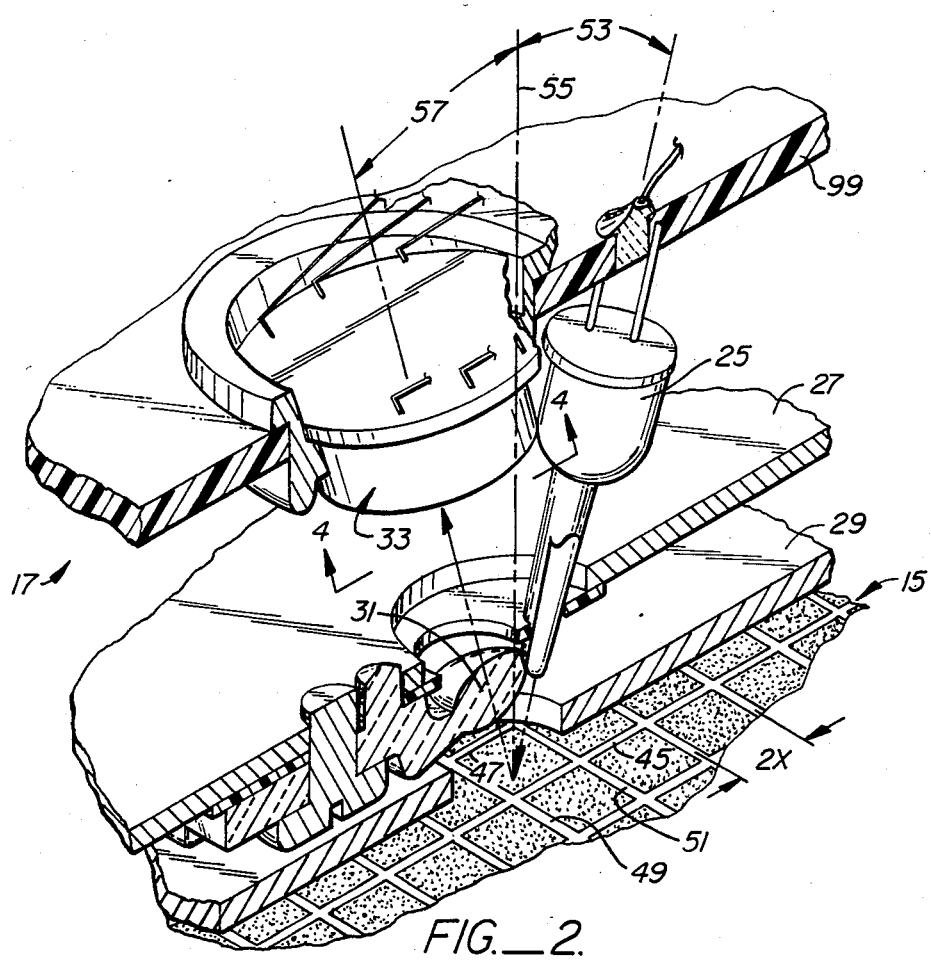
FIG._2.

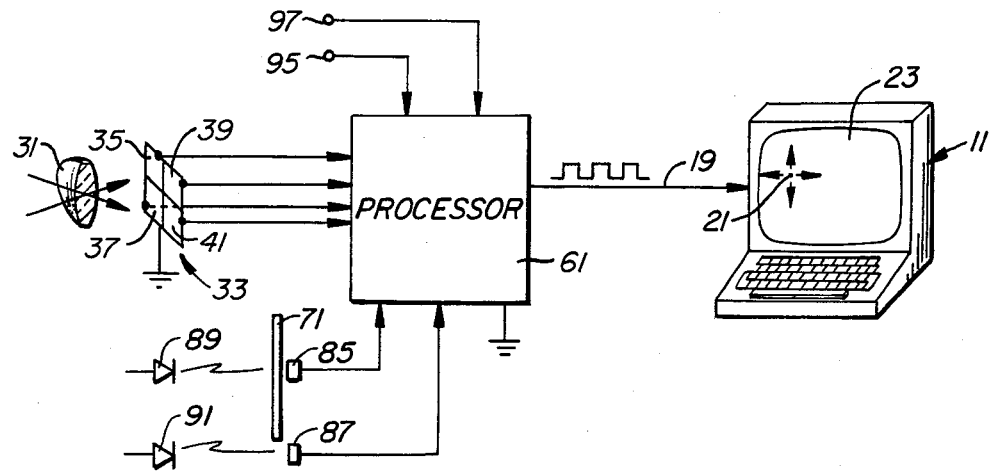
FIG._3.
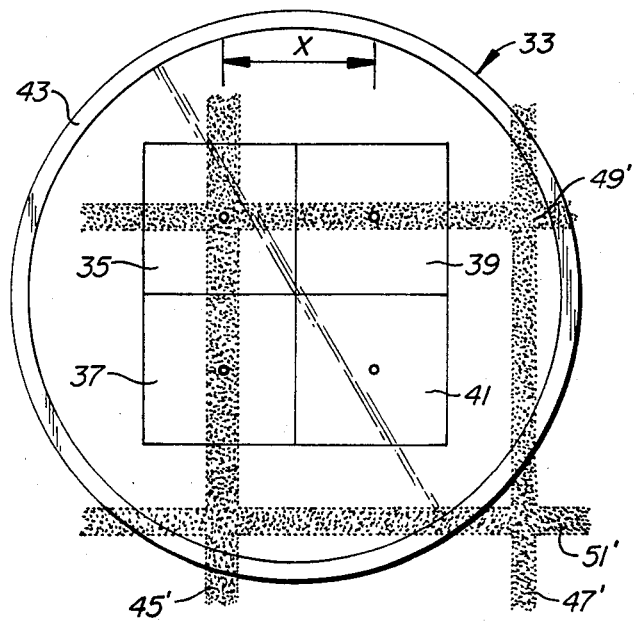
FIG._4.

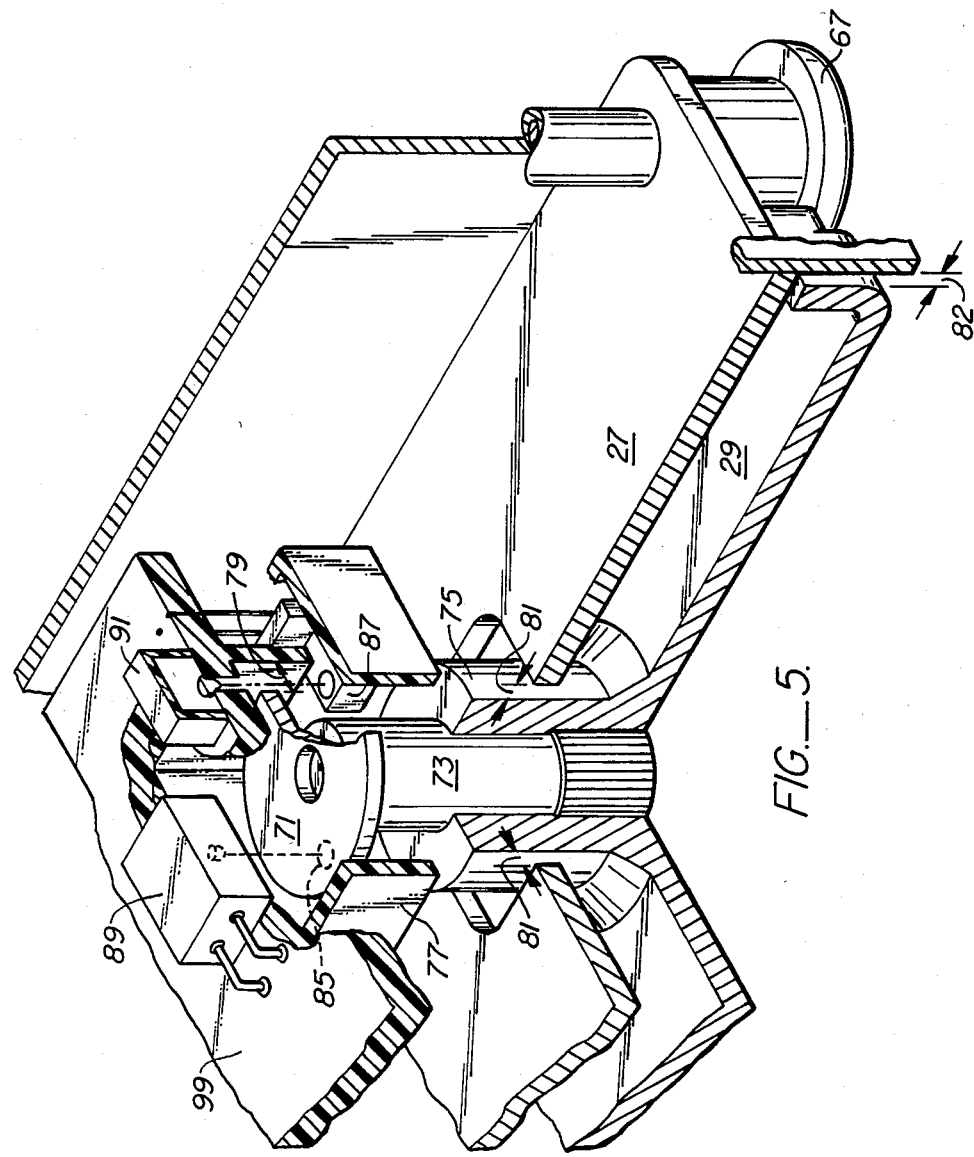
FIG._5.

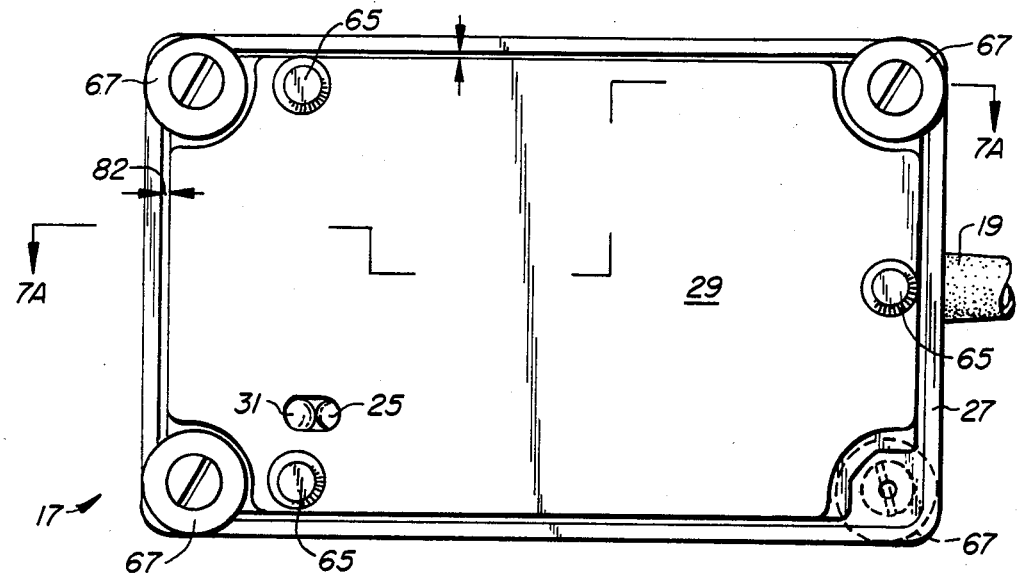
FIG._6.
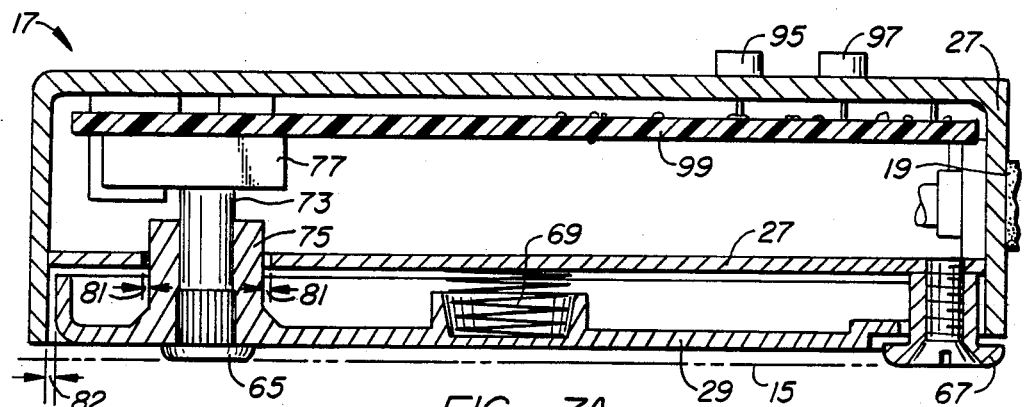
FIG._7A.
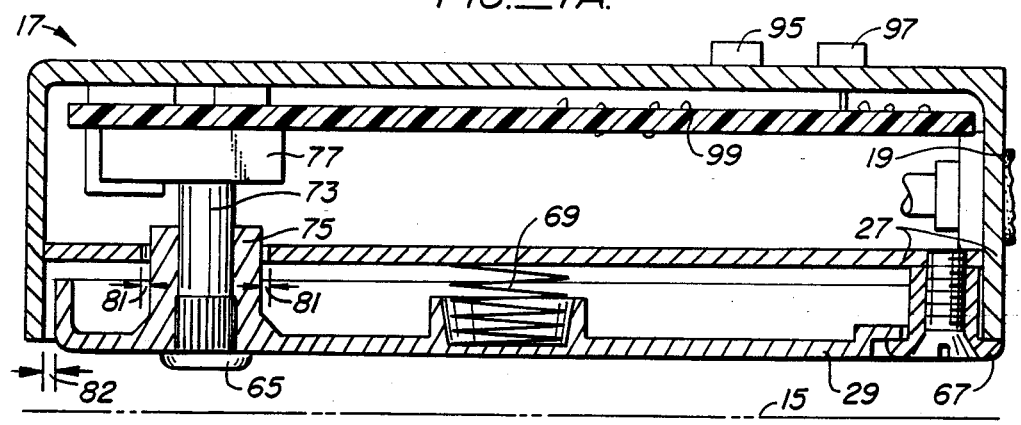
FIG._7B.

OPTO-MECHANICAL CURSOR POSITIONING DEVICE

BACKGROUND OF THE INVENTION

This invention relates generally to a device and technique for positioning a cursor on a cathode ray tube (CRT) or other display device, and more specifically to that type of device referred to as a "mouse" which is moved across a surface to develop a cursor moving signal.

The computer applications where it is necessary to move the cursor are numerous. Word processing and graphics applications are among them. In all such applications, it is desired to move the cursor across the display screen to a new location as swiftly and accurately as possible. When the cursor is at a new location, textual material may be entered into the computer for display at that location, in a word processing application, or graphic symbols may be drawn in reference to that point, in the case of graphics applications.

In many such applications, the basic method of moving the cursor from one location to another involves use of the computer system keyboard, either the standard alpha-numeric characters or the use of special function, cursor moving keys. Other techniques are alternatively utilized, such as cursor movement through an external joy stick or bit pad. These two devices are particularly popular in electronic game applications. Another technique that has been suggested is for a manually operable ball to be held in a rotatable position by an instrument that sits alongside the display device, the operator rotating the ball in the direction and to an extent of the desired cursor movement. Other cursor movement techniques include light or pressure sensitive CRT screens upon which the user moves an instrument to cause the cursor to move.

Another type of device is currently gaining considerable acceptance over these other techniques for many applications. That is to use a "mouse" which is moved by hand over a horizontal surface near the computer or other display device, thereby causing the cursor to move across the screen in accordance with the movement of the mouse. The "mouse" is so named because of its small size, its mouse like movement across a surface and the existence of a cable extending out of one end which looks like a tail. The cable communicates the cursor position signals generated by the mouse to the host computer or other display device. The signals track the user's hand when moving over a horizontal surface adjacent the host computer. The mouse is capable of rapidly moving the cursor from one point to another.

There are two basic types of such mice which are being used or seriously proposed. The first is a mechanical type that utilizes an arrangement of balls or wheels that ride along the horizontal surface as the mouse is moved by hand. The distance and direction of movement is converted by rotation of the balls or wheels into appropriate electrical signals within the mouse, these signals then being used to move the cursor on the host computer display screen. Various forms of this type of mouse are described in U.S. Pat. Nos. 3,541,541; 3,835,464 and 3,987,685.

The second type of mouse uses a periodic optical pattern that is placed on the horizontal surface across which the mouse is moved, an optical detection system being provided within the mouse to determine from the scanned optical pattern the extent and direction of the desired cursor movement. An article entitled "Designing and Testing the Optical Mouse", appearing in *VLSI Design*, January/February, 1982, pages 20–30, describes optical techniques for determining both direction and extent of mouse movement by purely optical means. This involves the use of a large number of photo-detectors and a complicated algorithm executed by computer software.

It is a primary object of the present invention to provide an improved mouse that is simple in construction, thus trouble free, inexpensive and easy to manufacture, as well as being reliable and easy to use.

SUMMARY OF THE INVENTION

This and additional objects are accomplished by the various aspects of the present invention, wherein, briefly, optical techniques are used with an associated grid pattern across which the mouse is passed, while a mechanical technique is used for determining the direction that the mouse is travelling. The direction detection is accomplished, according to a preferred form of the invention, by building its enclosure of two primary members, one of which rests on the grid pattern across which the mouse is moved and the other of which is shaped and positioned to be held by the hand. Thus, when the mouse is moved from rest, or its direction suddenly changed, there results a small movement between the two enclosure members. The detection of the direction of this movement provides a signal which is used in controlling the direction of cursor movement of the host computer or other display device. The position signal is combined with the distance signal from the optical detector.

Additional objects, advantages and features of the various aspects of the present invention can best be understood by referring to the following description of a preferred embodiment thereof, which description should be taken in conjunction with the accompanying drawings.

BRIEF DESCRIPTION OF THE DRAWINGS

FIG. 1 generally illustrates the use of the improved mouse according to the present invention;

FIG. 2 is a blown up perspective view of the optical detector system of the improved mouse according to the present invention;

FIG. 3 is a schematic diagram that illustrates the electronic connection of the various detector components of the improved optical mouse according to the present invention;

FIG. 4 illustrates schematically the detection of a grid pattern by the optical system shown in FIG. 2, taken at section 4—4 thereof;

FIG. 5 is a blown up perspective view of a preferred direction detecting system of the improved mouse according to the present invention;

FIG. 6 shows a view from the underside of a preferred embodiment of the present invention;

FIG. 7A shows a section of the mouse of FIG. 6 at section 7A—7A thereof; and

FIG. 7B is the same view as FIG. 7A but with the mouse being lifted from its supporting surface.

DESCRIPTION OF A PREFERRED EMBODIMENT

Referring initially to FIG. 1, the general use of a mouse such as the type of the present invention is illustrated. A host computer 11 sits on a table top or other substantially horizontal surface 13. A thin pad 15 also lies on the surface 13 and contains an appropriate optical pattern to be described later. A mouse 17 is manipulated by the hand of the user to move across the pad 15 in order to develop signals in conductors 19 which cause a cursor 21 on the face of a cathode ray tube (CRT) 23 to be moved a distance and direction as commanded by the hand movement of the mouse 17 relative to the optical pattern of the pad 15. A normal movement of the cursor 21 is either horizontally or vertically in small increments referred to as "pixels". It is the number of pixels moved and the direction of such cursor movement that depends upon the extent and direction of movement of the mouse 17 across the optical pad 15.

Referring primarily to FIGS. 2, 3 and 4, the optical detection system of the mouse 17, according to a preferred embodiment, will be described. A light emitting diode 25 is carried by a printed circuit board 99 which is attached to the chassis 27 of the mouse enclosure. Light is thus shown down through an opening of a bottom shoe member 29, onto the optical pattern of a pad 15. The illuminated portion of the pad 15 is imaged by a lens 31 onto a photo-detector 33 that is also carried by the printed circuit board 99. A preferred photo-detector 33 is a commercially available one having four independent detectors 35, 37, 39 and 41 arranged in a common plane and carried within a circular housing 43.

The optical pattern on the surface 15 is shown to contain a plurality of orthogonally arranged, equally spaced parallel lines, such as the lines 45 and 47 in one direction, and lines 49 and 51 arranged orthogonally thereto. These lines are preferably made to be specularly reflecting in order to make the best use of the available light from the light source 25, while the remaining areas of the mat 15 between these lines is made to be black and substantially non-reflective. The illuminating light beam from the source 25 is directed against the pad 15 at an angle 53 with a vertical 55 of the mouse structure, while the detector 33 is arranged to receive an image of the reflected light at substantially the same angle 57 on the other side of the vertical 55. Of course, other arrangements of patterns, such as circles and the like, on the pad 15 may alternatively be employed. Further, other detecting techniques may alternately be employed, such as changes in refraction rather than reflection. The sole purpose of the optical detection technique illustrated in FIGS. 2-4 is to count periodically recurring optical changes as the mouse 17 is moved across the optical pattern on the pad 15 and there are numerous types of optical variations which can be used as a basis for measuring distance of movement of the mouse across the pattern.

Referring to FIG. 4, an image of two sets of optical lines 45', 47', 49' and 51' from the pad 15 overlies the various elements of the detector 33. The spacing of the lines on the pad 15 is made such that their image cast on the detector results in the lines being approximately twice as far apart as the distance between the center points of the detector elements 35, 37, 39 and 41. Electrical levels proportional to the intensity of light striking each of these photo-detectors are applied in individual circuits to a master processor 61. As the image of a line such as the line 49' crosses over a detector as a result of movement of the mouse 17 over the pad 15, the electrical signal level output will increase. The processor 61 is preferably of a conventional type that interrogates the intensity level output signal of each of the detectors 35-41 many thousands of times each second and notes any changes in that intensity which show the mouse 17 to be moving across the pad 15. When such an intensity spike is noted to occur at substantially the same time from the detectors 35 and 39, for example, it is known that the mouse 17 is being moved in a vertical direction as shown in FIG. 4 with respect to the image of the optical pad 15. Similarly, if there are intensity peaks substantially simultaneously from the detectors 39 and 41, then it is known that the direction is across the paper as shown in FIG. 4. Whenever such simultaneous peaks are noted by the processor 61, the cursor 21 is caused to be moved one pixel, either then or later on a repetitive cycle.

This simplified optical detection system intentionally does not provide full information as to the direction that the mouse is being moved with respect to the optical grid pattern on the pad 15. Rather than making the optical system and resulting interpretive processing extremely more complicated in order to accomplish this, the preferred form of the invention detects direction generally by a separate system. It has previously been mentioned that the enclosure of the mouse 17 is formed of two primary members, a shoe 29 and a chassis 27, the arrangement thereof being apparent from FIGS. 6, 7A and 7B. A plurality of supporting pads 65 protrude downwards from the bottom of the shoe member 29 for resting it upon the pad 15. The chassis 27 is supported on the pad 15 by a plurality of feet 67, one of which is shown in dotted outline in FIG. 6 so that the structure of the other elements adjacent a corner can be readily seen. The chassis 27 and shoe 29 are connected by a spring 69 but are otherwise free to slide independently across the pad 15, except that cooperative parts are dimensioned such that the members 27 and 29 can move only a short distance with respect to each other, this distance preferably being small enough so that the user does not even notice it. The user holds onto the chassis member 27, and it can be seen that when the mouse is moved across a pad 15 by being so held, the chassis 27 will begin to move an instant later after the gap between the two members 27 and 29 is closed in the direction of motion given to the mouse by the hand of the user. It is the closing of the small gap upon the mouse being moved from a rest position, or abruptly changed in its direction of movement, that is detected and which provides in a simple manner the necessary direction information for movement of the cursor 21.

A preferred detector of this motion is best illustrated with reference to FIG. 5. A shutter 71 in the form of a circular disc rests on a top end of a spud 73 that is held tightly within a round boss 75 that is formed as a part of the bottom shoe 29. The spud 73 is preferably made of a magnetic material and is lightly magnetized, the shutter 71 also being of a magnetic material and thus held from dislodging from the end of the spud 73 by a magnetic attraction therebetween. A substantially square vertically extending wall 77 is attached to the chassis 27 and completely surrounds the shutter 71. The shutter 71 is made to have a diameter less than the dimension across the interior portion of the containment structure defined by the wall 77, as illustrated by a gap 79 shown in FIG. 5. The gap 79 is made to be less than the distance of permitted motion between the chassis 27 and shoe 29, as shown in FIG. 5 by the gap 81. It can thus be seen that as there is relative motion between the chassis 27 and the shoe 29, which results from moving the mouse 17 across the pad 15. The relative motion of the shoe 29 is limited in both X and Y directions by the gap 81 formed by the boss 75 and the accepting hole in the chassis 27. An appropriate side of the gap 81 will be closed, depending upon the direction of motion. When this happens, the shutter 71 will be contacted at one point by an interior portion of a wall 77. The location of this contact, or conversely, the location of remaining gaps between the edge of the shutter 71 and the wall 77, is an indication of direction of movement of the mouse. Spaces 82 between an outside edge of the shoe 29 and walls of the chassis 27 are made larger than the percission controlled gap 81 so they do not limit the relative motion between the shoe and chassis.

The location of these gaps is detected, according to the preferred embodiment being described, by a pair of photo-detectors 85 and 87, and their respective associated light emitting diodes 89 and 91. The two detectors 85 and 87 are displaced substantially 90 degrees from each other on radial lines from a center line of the spud 73.

The outputs of the detectors 85 and 87 are connected to the processor 61 in order to provide an electrical signal proportional to the direction of movement of the mouse. Processor 61 periodically interrogates the intensity level output signal of each of these detectors 85 and 87 so when it detects a change, a movement of the mouse from rest or a change in direction has occurred, and the cursor 21 is then instructed to similarly change direction.

It will be noted from comparing the sectional views of FIGS. 7A and 7B that the relatively independent shoe 29 and chassis 27 members are interconnected to stay together when the mouse 17 is lifted off the surface 15 by hand through contact with the chassis 27. As FIG. 7B illustrates, the shoe 29 rests, in that situation, upon the feet 67.

In order to increase the control capability of the mouse 17, it will be desirable in certain applications to include control switches activated by external buttons, such as the buttons 95 and 97 (FIGS. 7A, 7B) positioned on its top surface. These buttons can activate switches located on printed circuit board 99 positioned within the mouse enclosure. Electronics can be provided within the mouse that operate in response to the push button control to cause certain special effects to occur in the movement of the cursor 21 over the CRT screen 23.

Although the various aspects of the present invention have been described with respect to a specific example, it will be understood that the invention is entitled to protection with the full scope of the appended claims.

It is claimed:

1. A device for controlling the position of a cursor in a display instrument, comprising:
   an enclosure adapted to rest on a surface and be moveable by hand thereacross;
   optical means responsive to relative motion between said enclosure and a surface for detecting the extent of motion of said enclosure relative to said surface, said optical means being contained within said enclosure and requiring no physical contact with said surface, and
   mechanical means within said enclosure and independent of said optical means for detecting the direction of movement of said enclosure across said surface without having to physically contact said surface other than the enclosure being adapted to rest on said surface.
   thereby optically developing a signal proportional to distance traversed and independently developing a signal indicating the direction of such movement, whereby said signals in combination are usable to controllably move a cursor across a display instrument.

2. A device for controlling the position of a cursor in a display instrument, comprising:
   an enclosure adapted to rest on a surface and be moveable by hand thereacross, said enclosure including first and second primary members, said first member being held adjacent a bottom of said enclosure and adapted for resting on a horizontal surface, said second member being held adjacent a top surface of said enclosure and shaped for being held by hand, said first and second members being held together in a manner that they are moveable a small distance with respect to each other when said enclosure is moved by hand across said surface,
   optical means responsive to relative motion between said enclosure and the surface for developing an electrical signal proportional to the extent of motion of said enclosure relative to said surface, said optical means being contained within said enclosure and having no physical contact with said surface, and
   means within said enclosure detecting the relative motion between said first and second members for developing an electrical signal representative of a direction of travel of said enclosure across said surface,
   whereby electrical signals are provided that are useable by a display instrument to move its cursor an extent and direction that is proportional to the movement of the enclosure by hand across said surface.

3. The device according to claim 2 wherein said direction signal developing means comprises:
   a disc supported on a surface within said enclosure that is carried by one of said first or second members, said disc being constrained in its movement across said surface by a constraining structure carried by the other of said first and second members,
   said disc having dimensions in all directions slightly smaller than those of said constraining structure, whereby said disc can move within said constraining structure, and
   means within said enclosure for detecting when the gap between said disc and the constraining structure is closed or open at at least two positions therearound, said detecting means giving an indication of a direction in which said enclosure is moved across the surface upon which it is resting.

4. The device according to claim 3 wherein said disc is magnetically coupled to its supporting surface to a degree to prevent it from dislodging therefrom but easily permitting it to be moved thereacross when engaged by its said constraining structure.

5. The device according to claim 3 wherein the gap between said disc and its said constraining structure is significantly less than the maximum movement permitted between said first and second enclosure members.

6. A method of moving a cursor across a display device, comprising:

providing an optical pattern on a substantially horizontal surface, scanning said pattern with an optical detector that counts the number of elements of said pattern that are crossed by said detector, thereby to generate a signal as to only the magnitude of desired cursor movement, developing a signal proportional to direction of desired cursor movement by mechanically determining independently of said optical detector the direction at which the optical detector is scanned across said pattern without having to specially contact said surface, and combining said direction and magnitude signals in a manner to drive said cursor a distance and direction across said display device in accordance with the movement of said optical detector across said pattern.

* * * * *